United States Patent
Ho et al.

(10) Patent No.: US 10,254,575 B2
(45) Date of Patent: Apr. 9, 2019

(54) DISPLAY DEVICE

(71) Applicant: GIGA-BYTE TECHNOLOGY CO., LTD., New Taipei (TW)

(72) Inventors: Jui-Fong Ho, New Taipei (TW); Huang-Jen Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/851,386

(22) Filed: Dec. 21, 2017

(65) Prior Publication Data

US 2018/0188588 A1 Jul. 5, 2018

(30) Foreign Application Priority Data

Dec. 29, 2016 (TW) .............................. 105143967 A

(51) Int. Cl.
*H05K 7/02* (2006.01)
*H05K 7/04* (2006.01)
*G02F 1/1333* (2006.01)
*G06F 1/16* (2006.01)

(52) U.S. Cl.
CPC ...... *G02F 1/133308* (2013.01); *G06F 1/1637* (2013.01); *G02F 2001/133314* (2013.01); *G02F 2001/133317* (2013.01); *G02F 2001/133328* (2013.01); *G02F 2001/133331* (2013.01); *G02F 2202/28* (2013.01)

(58) Field of Classification Search
CPC ............. G02F 1/133308; G02F 1/1637; G02F 2001/133314; G02F 2001/133317; G02F 2001/133328; G02F 2001/133331; G02F 2001/28

USPC ......................................... 361/807, 809, 810
See application file for complete search history.

(56) References Cited

U.S. PATENT DOCUMENTS

| | | | | |
|---|---|---|---|---|
| 6,532,152 B1* | 3/2003 | White | ............... | G02F 1/133308 312/223.1 |
| 7,394,186 B2* | 7/2008 | Kim | ...................... | G06F 1/1601 313/46 |
| 7,602,467 B2* | 10/2009 | Lee | ..................... | G02F 1/13452 349/149 |
| 7,639,489 B2* | 12/2009 | Miyoshi | ................. | H04N 5/645 313/46 |
| 8,405,308 B2* | 3/2013 | Matsudate | ............ | H01L 51/529 312/223.2 |
| 8,559,192 B2* | 10/2013 | Murakata | .............. | G06F 1/1601 345/905 |

(Continued)

*Primary Examiner* — Hung S. Bui
(74) *Attorney, Agent, or Firm* — Maschoff Brennan

(57) ABSTRACT

A display device comprises a casing, at least one adhesive member, a display panel and a flexible frame. The casing comprises a bottom plate and a plurality of lateral plates, and the plurality of lateral plates respectively connected to sides of the bottom plate so as to form an accommodating space within. The adhesive member attaches the bottom plate. The display panel disposes in the accommodating space and attaches the adhesive member. The flexible element comprises three side bars. Each side bar comprises a support part, a side part and a cover part. The side part connects to the support part and the cover part. The three side parts respectively disposes on three adjacent sides of the display panel and a portion of the display panel is sandwiched between the support part and the cover part.

11 Claims, 5 Drawing Sheets

(56) References Cited

U.S. PATENT DOCUMENTS

| | | | |
|---|---|---|---|
| 9,002,419 B2* | 4/2015 | Satou | G06F 3/044 |
| | | | 455/128 |
| 9,049,804 B2* | 6/2015 | Lang | H05K 7/20963 |
| 2009/0067112 A1* | 3/2009 | Takabayashi | G02F 1/13452 |
| | | | 361/220 |
| 2009/0225507 A1* | 9/2009 | Sato | H05K 7/20963 |
| | | | 361/679.21 |
| 2014/0002768 A1* | 1/2014 | Kuo | G02F 1/133512 |
| | | | 349/60 |

* cited by examiner

DISPLAY DEVICE

CROSS-REFERENCE TO RELATED APPLICATIONS

This non-provisional application claims priority under 35 U.S.C. § 119(a) on Patent Application No(s). 105143967 filed in Taiwan, R.O.C. on Dec. 29, 2017, the entire contents of which are hereby incorporated by reference.

TECHNICAL FIELD

The present disclosure relates to display devices, more particularly to a display device with a flexible frame.

BACKGROUND

With the development of the semiconductor industry and related electronics industry, the trend in digital products, such as smartphones, notebook computers, tablet PCs, and flat-screen TVs, toward more convenient, versatile and aesthetically pleasing. Display screens are necessary when using such products; and liquid crystal display (LCD) devices have become mainstream. Since the LCD devices are not self-emissive devices, light sources such as backlight modules for illuminating the display are required.

Various methods have been employed to uphold a LCD module together with a backlight module. A conventional way is to use a shell to enclose the edges of the LCD module as well as those of the backlight module. However, the edges are covered by the shell with a large space, causing the overall thickness and the border width of the display device being unable to be effectively reduced.

SUMMARY

The present disclosure provides a display device with narrow frame.

A display device disclosed as one embodiment of the present disclosures may comprise a casing, at least one adhesive member, a display panel and a flexible frame. The casing comprises a bottom plate and a plurality of lateral plates. The bottom plate has sides. The plurality of lateral plates is respectively connected to the sides of the bottom plate so as to form an accommodating space therewithin. The adhesive member is attached to the bottom plate. The display panel is disposed in the accommodating space and is attached to the adhesive member. The flexible element comprises three side bars. Each side bar comprises a support part, a side part and a cover part. The side part is located between and connected to the support part and the cover part. The three side parts are respectively disposed on three adjacent sides of the display panel, and a portion of the display panel is sandwiched between the support part and the cover part.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
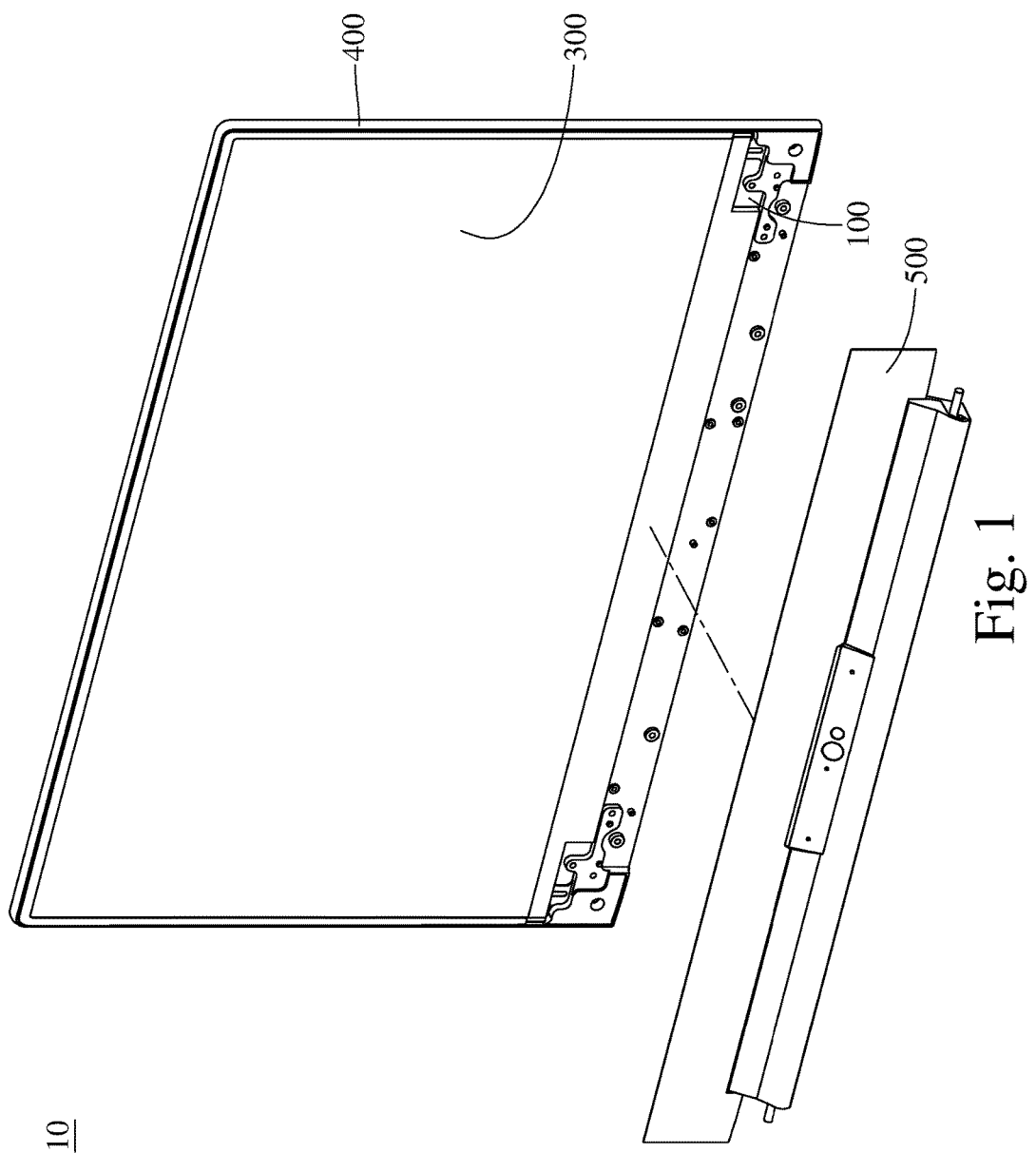
FIG. 1 schematically illustrates a perspective view of a display device according to a first embodiment of the present disclosure with a cover plate being detached therefrom.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a conventional display device, the display module and the backlight module is enclosed by two pieces, i.e. piece A and piece B, for assembling the two modules. The two pieces usually take a form of hooks and slots to fasten one another. The piece B is a rectangle case covering a front side (i.e. a display face) of the display module, and The piece A is a back casing disposing on a bottom surface of the display module; such that the display module is sandwiched between the pieces A and B. Since the top, left and right sides of the display module is covered by the piece B, the display area of the display panel cannot be reduced. Neither the thickness of the display device can be reduced due to the hooks and slots. So there is a need to provide a display device with narrow and thin frame.

The present disclosure provides a display device having a flexible and narrow frame for positioning and protecting the display panel. By using the flexible frame, the display panel can be positioned without the piece B. As a result, the display area of the display panel can be fully used so as to provide a larger display area on a small screen.

In the following descriptions, a display screen of a notebook computer is taken as an example to illustrate the embodiments of the display device of the present disclosure; from which the advantages of the present disclosure including reduced overall size, cushion to protect the display panel, and larger display area on a small screen will become apparent.

Figure 2:
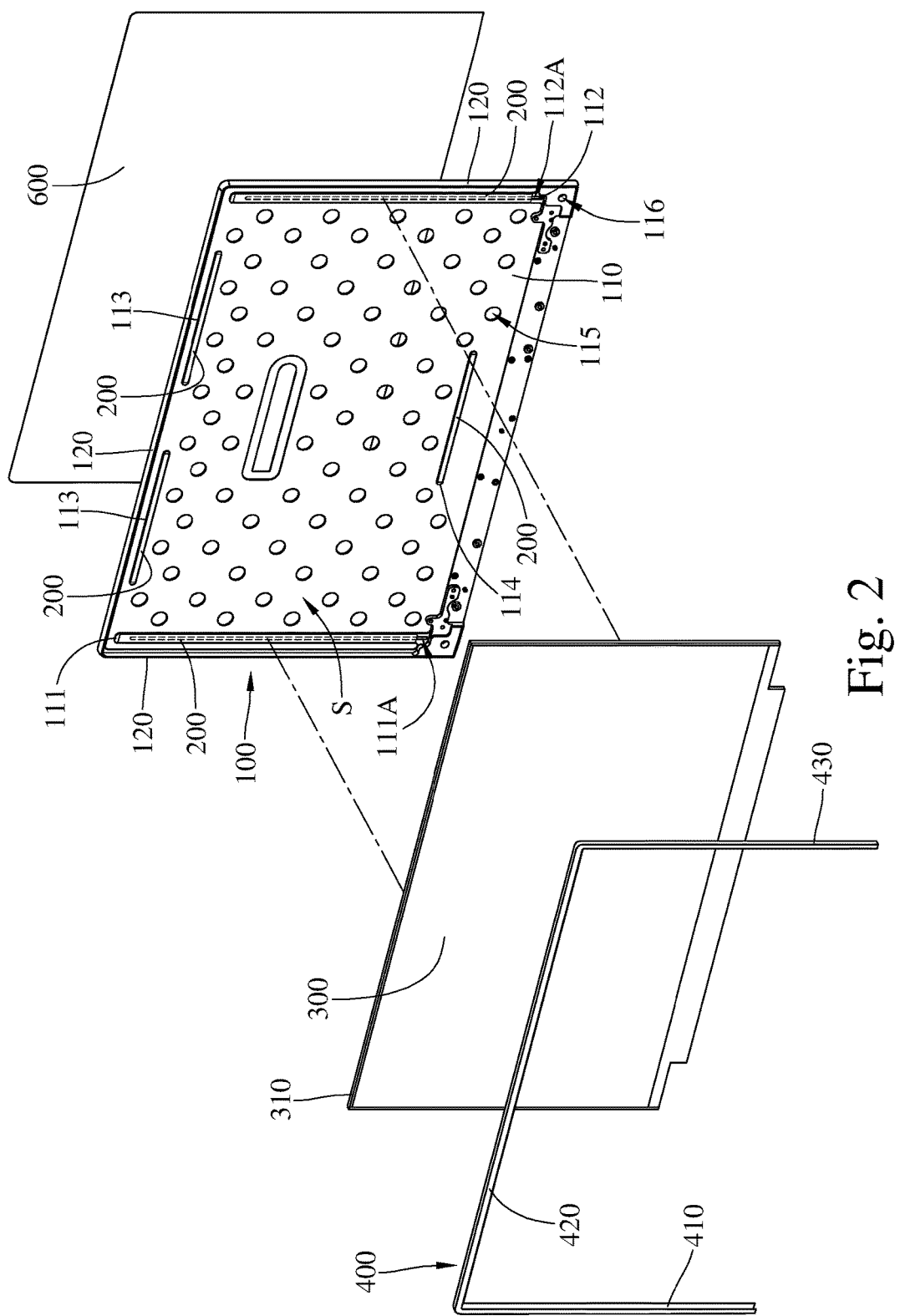
FIG. 2 schematically illustrates a partially exploded view of the display device in FIG. 1.
Figure 3:
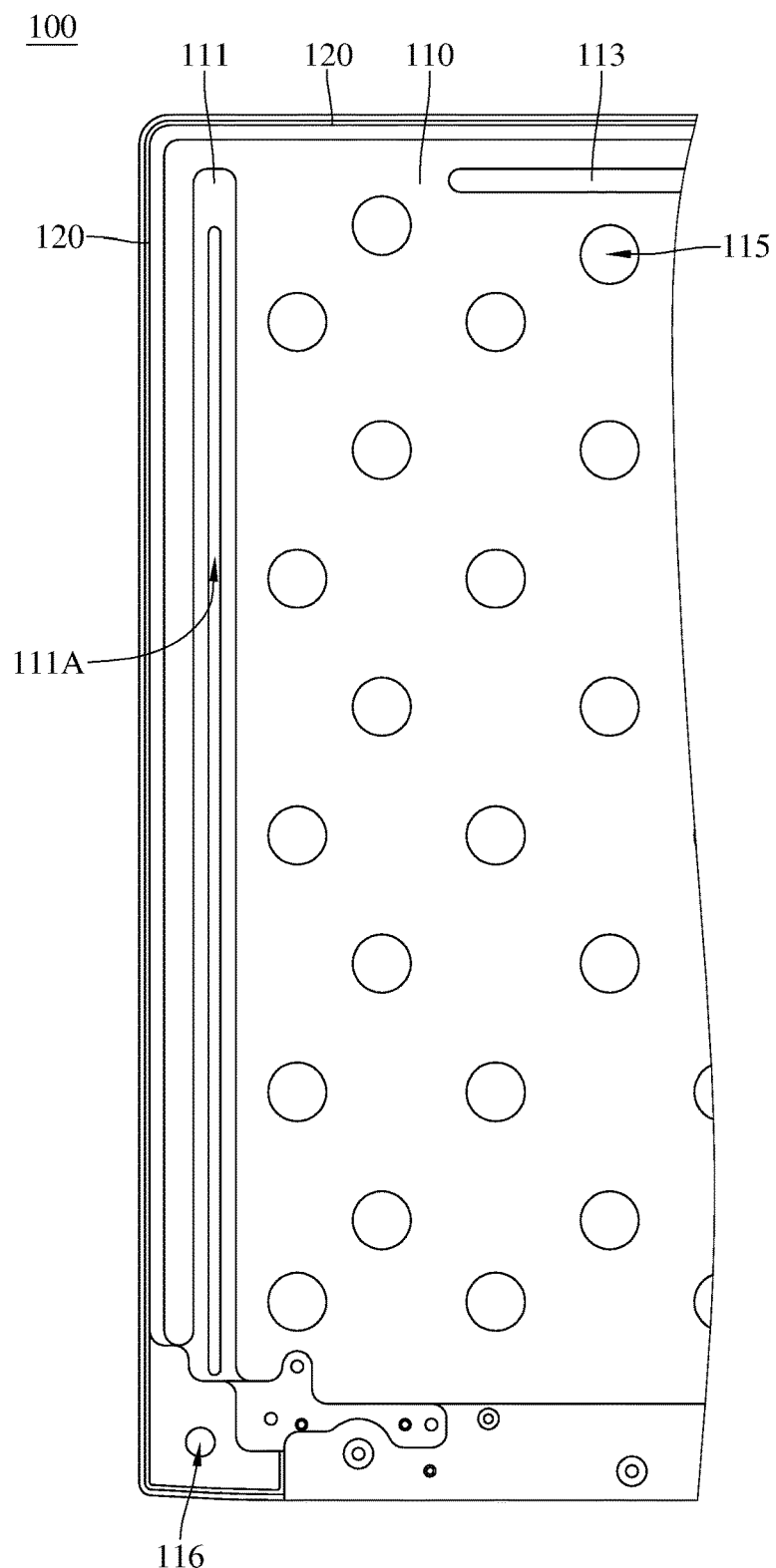
FIG. 3 schematically illustrates a partial enlarged front view of a casing in FIG. 2.
Figure 4:
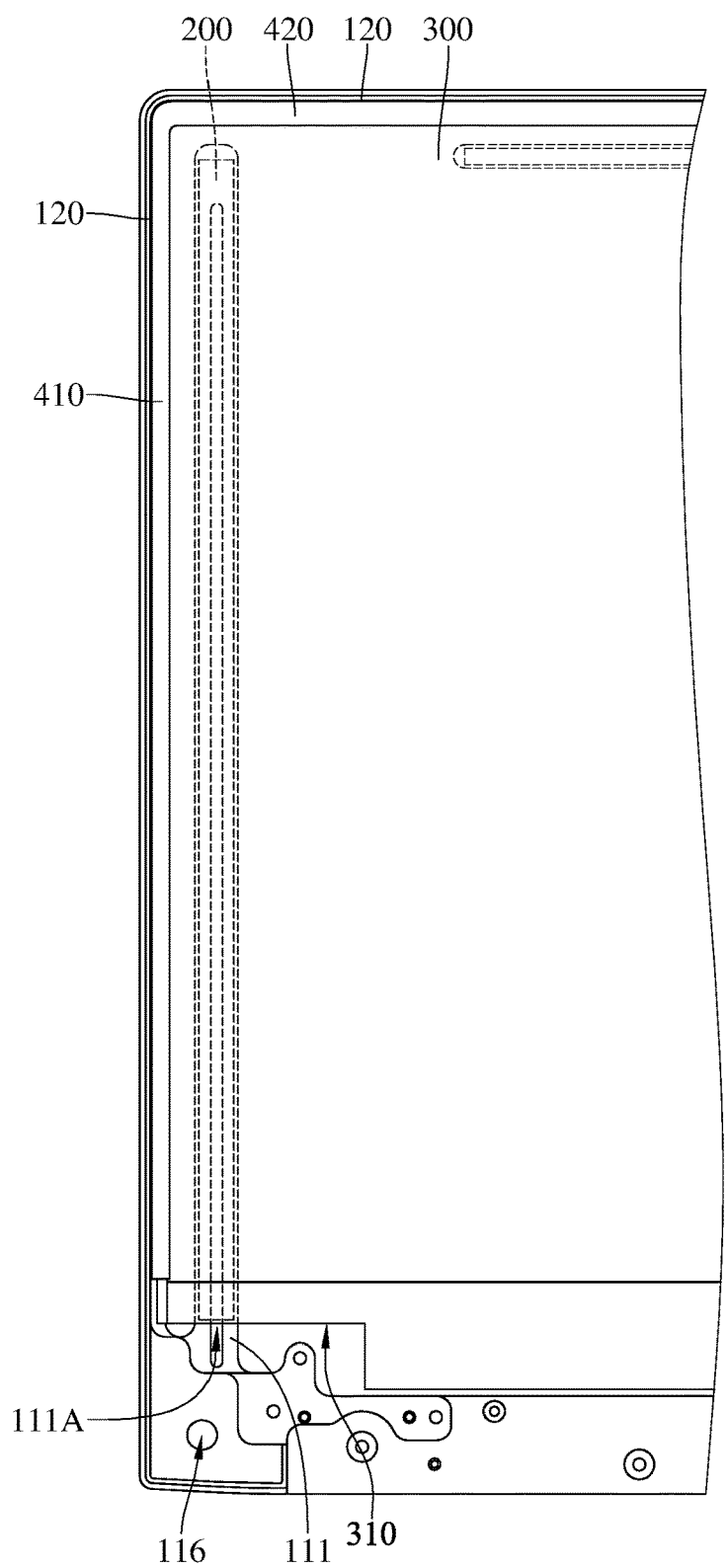
FIG. 4 schematically illustrates a partial enlarged front view of the display device in FIG. 1 with the cover plate being detached therefrom.
Figure 5:
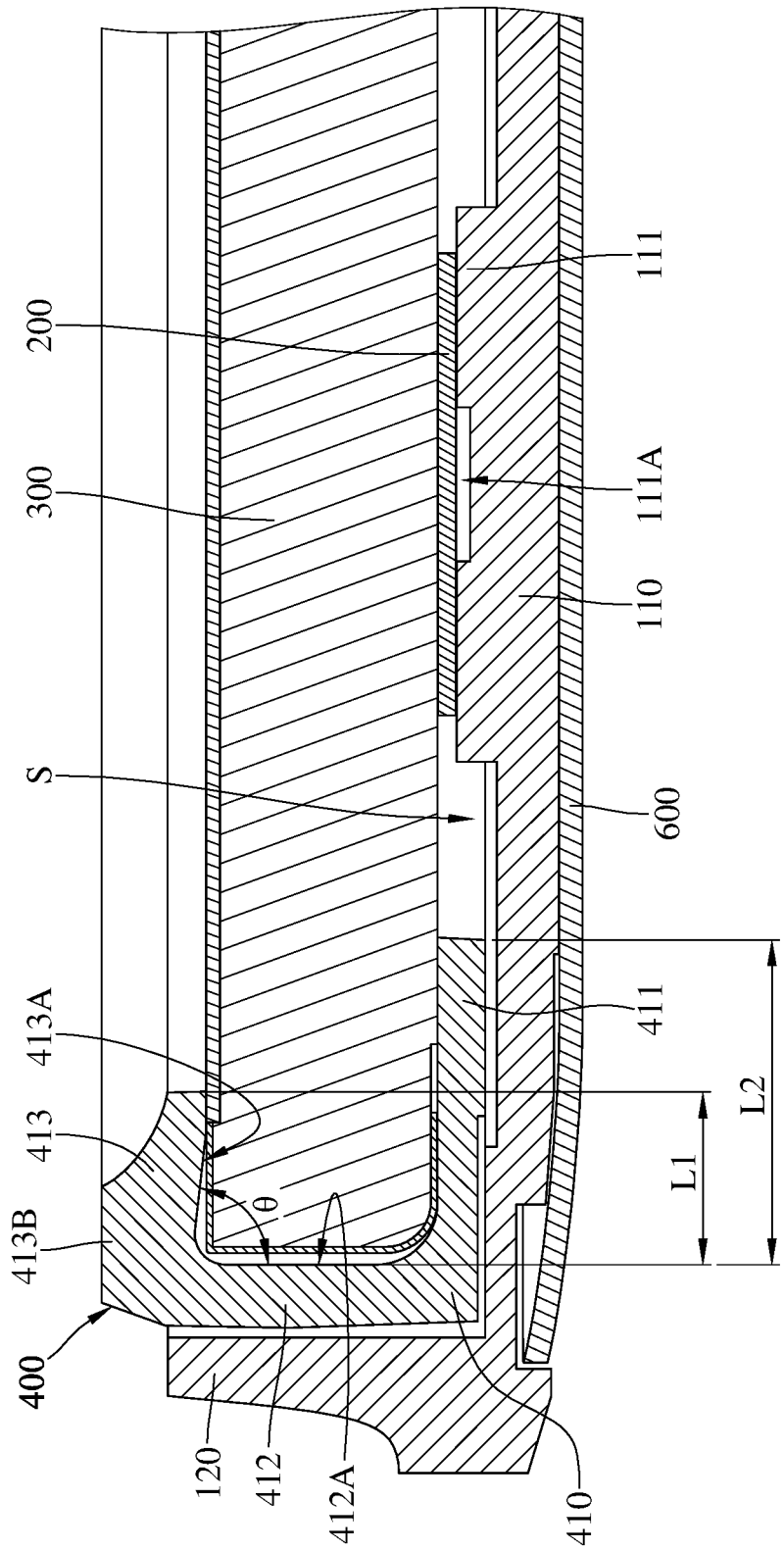
FIG. 5 schematically illustrates a partial enlarged cross-sectional view of the display device in FIG. 1.

Please refer to FIG. 1 to FIG. 5, FIG. 1 is a perspective view of a display device according to a first embodiment of the present disclosure with a cover plate being detached therefrom, FIG. 2 is an exploded view of the display device in FIG. 1, FIG. 3 is a partial enlarged front view of a casing in FIG. 2, FIG. 4 is a partial enlarged front view of the display device in FIG. 1 with the cover plate being detached therefrom, and FIG. 5 is a partial enlarged cross-sectional view of the display device in FIG. 1.

In the embodiment shown in FIG. 1, a display device 10 is provided. The display device comprises a casing 100, a plurality of adhesive members 200, a display panel 300, and a flexible frame 400.

As shown in FIG. 2 and FIG. 3, the casing 100 may comprise a bottom plate 110 and three lateral plates 120. The bottom plate 110 may have a plurality of sides. The lateral plates 120 are respectively connected to the sides of the bottom plate 110 so as to form an accommodating space S therewithin.

A side of the bottom plate 110 facing the accommodating space S may have a plurality of protrusions 111, 112, 113 and 114 for disposing the adhesive members 200. The protrusion 111 and the protrusion 112 are respectively located on the opposite sides of the bottom plate 110, and two protrusions 113 and the protrusion 114 are respectively located on the other opposite sides of the bottom plate 110. In addition, the protrusion 111 and the 112 respectively have a groove 111A and a groove 112A. Two opposite ends of the groove 111A are respectively close to two opposite ends of the protrusion 111, and two opposite ends of the groove 112A are respectively close to two opposite ends of the protrusion 112.

Furthermore, the bottom plate 110 may further have a plurality of punched holes 115 in order to reduce the weight of the bottom plate 110.

As shown in FIG. 2, the adhesive members 200 can be, for example, foam rubbers. Each adhesive member 200 may have two adhesive sides. One adhesive side of the adhesive member 200 is respectively attached to the protrusions 111,112,113 and 114; thereby the adhesive members 200 attached to the protrusions 111 and 112 respectively at least partially cover the grooves 111A and 112A.

As shown in FIG. 2 and FIG. 3, the display panel 300 may be disposed in the accommodating space S and is attached to the other adhesive side of the adhesive members 200.

As shown in FIG. 2 and FIG. 5, the flexible frame 400 can be made of, for example, a mixture of plastic and silicone, and can be produced by an injection molding process. The flexible frame 400 may comprise three side bars 410, 420 and 430 connected end to end. The three side bars 410, 420 and 430 may be respectively disposed on three adjacent sides of the display panel 300. Since the structures of the bars 410, 420 and 430 are the same, only the bar 410 is illustrated in the following description for simplicity. The side bar 410 may comprise a support part 411, a side part 412, and a cover part 413. The side part 412 is located between and connected to the support part 411 and the cover part 413. A portion of the display panel 300 is sandwiched between the support part 411 and the cover part 413.

In more details, in this embodiment, the cover part 413 may have a first abutment surface 413A, and the side part 412 may have a second abutment surface 412A. The first abutment surface 413A and the second abutment surface 412A may be respectively located at adjacent sides of the display panel 300, and the first abutment surface 413A may have an acute angle θ with respect to the second abutment surface 412A; that is, the first abutment surface 413A is inclined toward the display panel 300, such that the first abutment surface 413A is able to press against the display panel 300. As a result, the display panel 300 is tightly sandwiched between the cover part 413 and the support part 411 so as to secure the position of the display panel 300 on the flexible frame 400, thereby increasing the reliability of the display panel 300 during assembling.

In addition, in this embodiment, the cover part 413 can be located on the side of the display panel 300 away from the bottom plate 110, and the cover part 413 may have a convex cushion 413B. The convex cushion 413B is served to provide a buffer effect when the display device 10 is folded down over the keyboard so as to prevent them from hitting each other. Moreover, the convex cushion 413B and the side bar 410 can be integrated into a single piece, which is beneficial to simplify the overall assembly process.

Furthermore, given that a portion of the cover part 413 protruding from the second abutment surface 412A of the side part 412 has a length L1, and a portion of the support part 411 protruding from the second abutment surface 412A has a length L2, then, in this embodiment, L1 is smaller than L2, which is beneficial to enlarge the display area.

In this embodiment, the display device 10 may further comprise a cover plate 500, and a portion of the groove 111A and a portion of the groove 112A may be stretched out an edge 310 of the display panel 300. The cover plate 500 can be detachably mounted on the casing 100 for covering the portions of the grooves 111A and 112A, thus beautifying the appearance of the display device 100. When it is needed to disassembly the display device 100, the cover plate 500 can be detached and then a solution (e.g. alcohol) can be employed to be poured into the grooves 111A and 112A from the portions not covered by the display panel 300 to eliminate the stickiness of the adhesive members 200. By doing so, the display panel 300 can be easily removed from the casing 100 without damaging the display panel 300.

It should be noted that, in the above-mentioned embodiment, the adhesive member 200 is foam tape; and the grooves 111A,112A are provided at the protrusions 111,112 for being injected with alcohol so as to clean stickness. However, the present disclosure is not limited to the type of the adhesive members 200. In other embodiments, the adhesive member may be a sticky pad that would stick to objects but could be easily to be pulled off; in such a case, it is no need to provide the protrusions with grooves; for disassembly, only a portion of the stick pad is exposed outside the edge of the display panel 300 to be pulled off.

Moreover, in this embodiment, the display device 10 may further comprise a decorative plate 600. The decorative plate 600 can be detachably mounted on the side of the bottom plate 110 away from the display panel 300.

The bottom plate 110 may further have two detaching holes 116. The detaching holes 116 are through holes located at the outside of the outer edge 310 of the display panel 300. When assembling the cover plate 500 to the casing 100, the detaching holes 116 can also be covered to beautify the appearance of the display device 10. Accordingly, the decorative plate 600 can be detached by removing the cover plate 500 and using tools (e.g. a screwdriver) to penetrate through the detaching hole 116 to pry up the decorative plate 600.

According to the embodiments of the display device discussed above, due to the flexible frame and the adhesive members, the display panel can be positioned in place without putting a piece B over its front side; thus the display device may have a narrow frame. Furthermore, the display area of the display panel can be fully used so as to provide a larger display area on a small screen.

In addition, the flexible frame is relatively low in cost, and it can be disposed on the casing through the display panel, thus it is beneficial to reduce the manufacturing cost and the difficulty in assembling of the display device.

By using the flexible frame, the display panel can be positioned without the piece B. As a result, the display area of the display panel can be fully used so as to provide a larger display area on a small screen. The advantages include reduced overall size, providing buffer to the display panel, and providing larger display area on a small screen.

According to the display device above, the three adjacent sides of the display panel are mounted within the flexible frame, and the display panel is attached to the casing through the adhesive member, so the display panel is mounted without being covered by a metal or plastic front frame, and thus the borders on the display area of the display panel can be narrowed. As a result, the digital product having the display device of the present disclosure is able to provide a larger display area on a small screen, giving users a better experience.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A display device, comprising:
a casing comprising a bottom plate and a plurality of lateral plates, and the plurality of lateral plates being respectively connected to sides of the bottom plate so as to form an accommodating space therewithin;
at least one adhesive member attached to the bottom plate;
a display panel disposed in the accommodating space and attached to the adhesive member; and
a flexible frame comprising three side bars connected end to end and respectively disposed on three adjacent sides of the display panel, each of the side bars comprising a support part, a side part and a cover part, wherein the side part is located between and connected to the support part and the cover part, and a portion of the display panel is sandwiched between the support part and the cover part,
wherein at least a portion of the cover part is not covered by the casing.

2. The display device according to claim 1, wherein the cover part is located on a side of the display panel away from the bottom plate, and the cover part has a convex cushion.

3. The display device according to claim 2, wherein the cover part has a first abutment surface, and the first abutment surface is inclined toward and abutted against the display panel.

4. The display device according to claim 2, the cover part has a first abutment surface, the side part has a second abutment surface, the first abutment surface and the second abutment surface respectively located at adjacent sides of the display panel, and the first abutment surface is disposed at an acute angle with respect to the second abutment surface.

5. The display device according to claim 1, wherein a length of the cover part protruding from the side part is less than a length of the support part protruding from the side part.

6. The display device according to claim 1, wherein a side of the bottom plate facing the accommodating space has a plurality of protrusions, and when there is a plurality of adhesive members, the adhesive members are respectively attached to the plurality of protrusions.

7. The display device according to claim 6, wherein at least one of the plurality of protrusions has a groove, and a portion of the groove is stretched over an edge of the display panel.

8. The display device according to claim 7, further comprising a cover plate covering the portion of the groove stretched over the edge of the display panel.

9. The display device according to claim 1, wherein the bottom plate has a detaching hole not covered by the display panel.

10. The display device according to claim 1, further comprising a decorative plate mounted on a side of the bottom plate away from the display panel.

11. The display device according to claim 1, wherein the flexible frame is separated from the casing and is fixed to the casing via the display panel and the at least one adhesive member.

* * * * *